Nov. 20, 1923.
S. MILLER
1,474,487
METHOD OF AND APPARATUS FOR TRUING SURFACES
Filed May 13, 1922  3 Sheets-Sheet 2
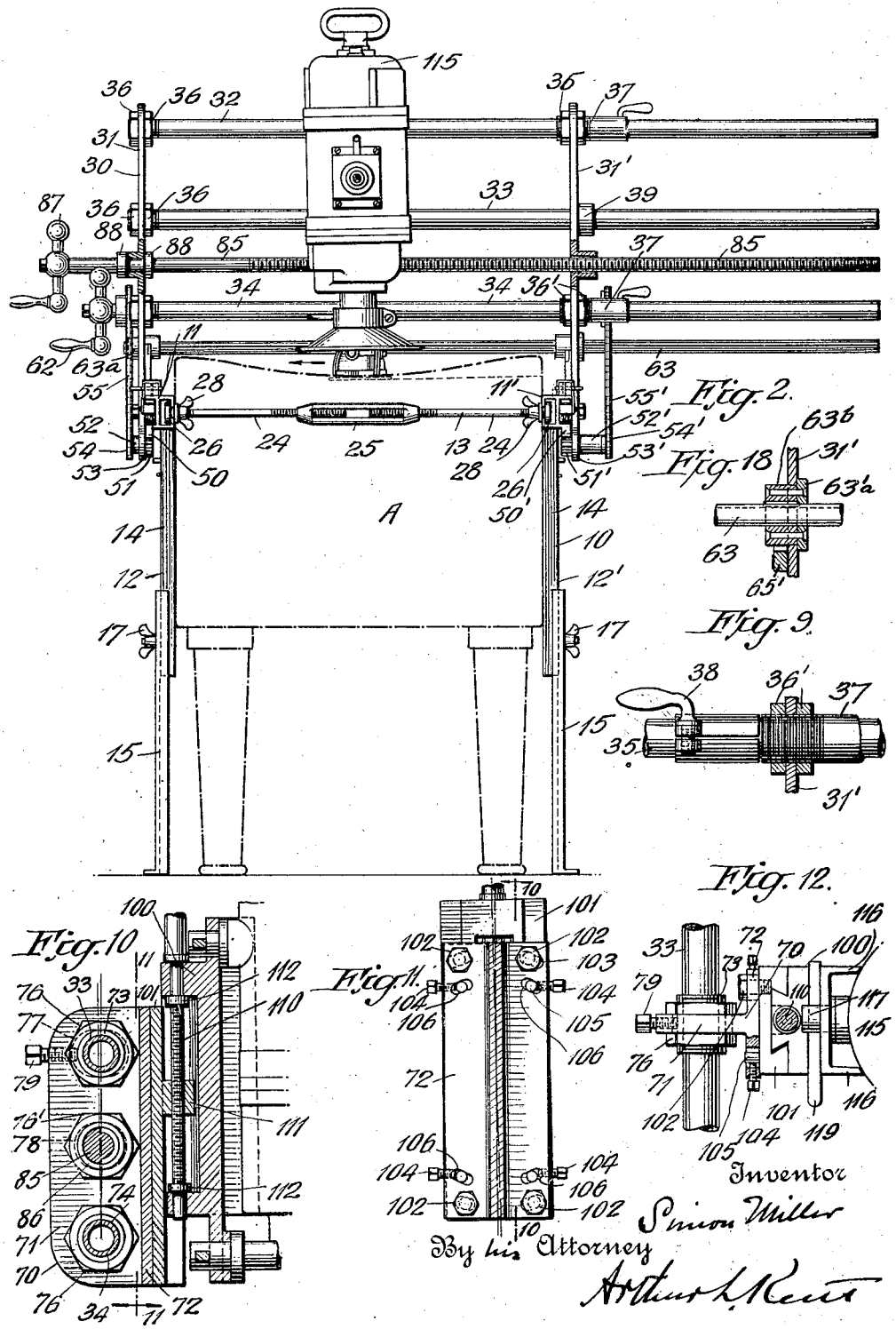

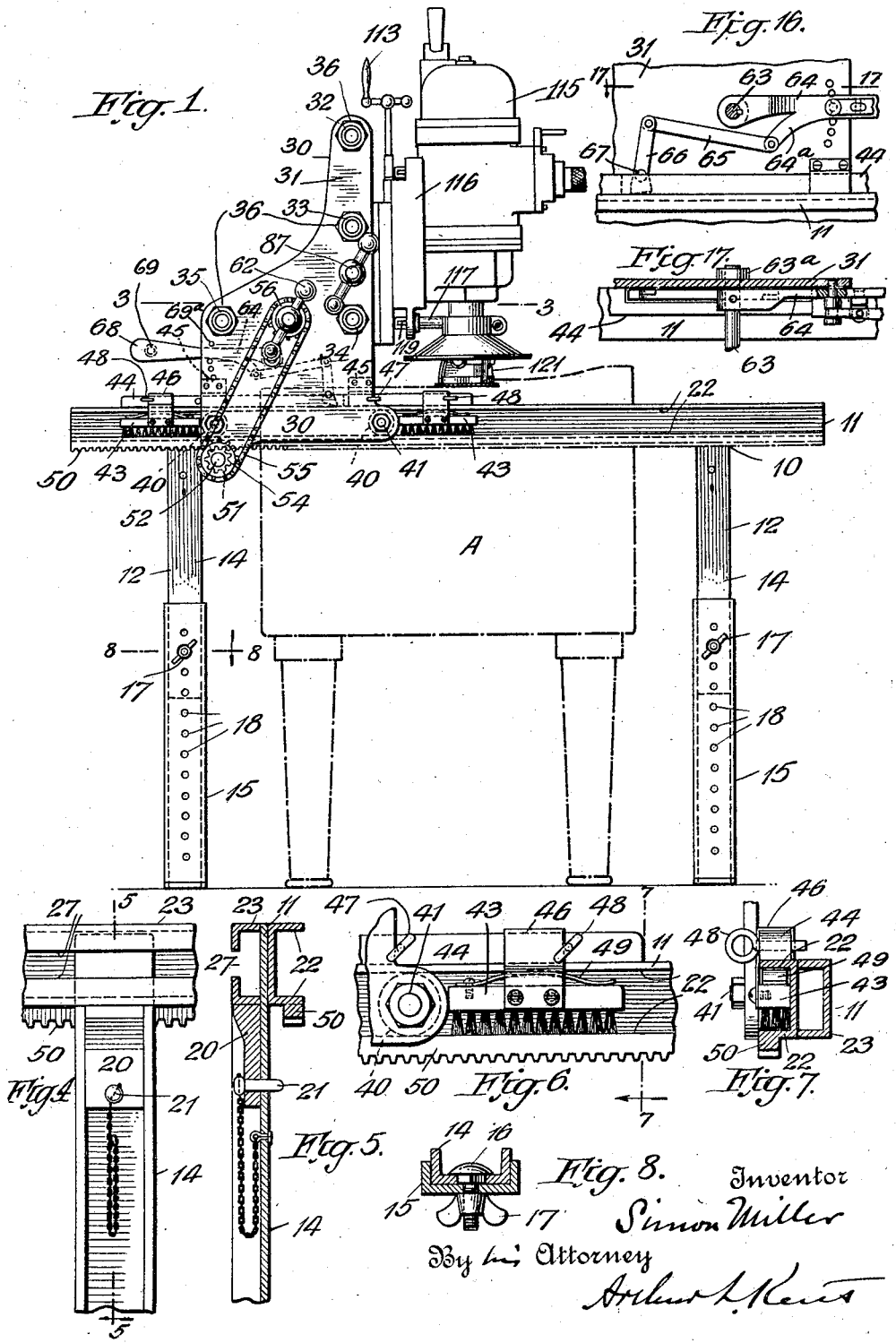

Nov. 20, 1923.
S. MILLER
1,474,487
METHOD OF AND APPARATUS FOR TRUING SURFACES
Filed May 13, 1922
3 Sheets-Sheet 3
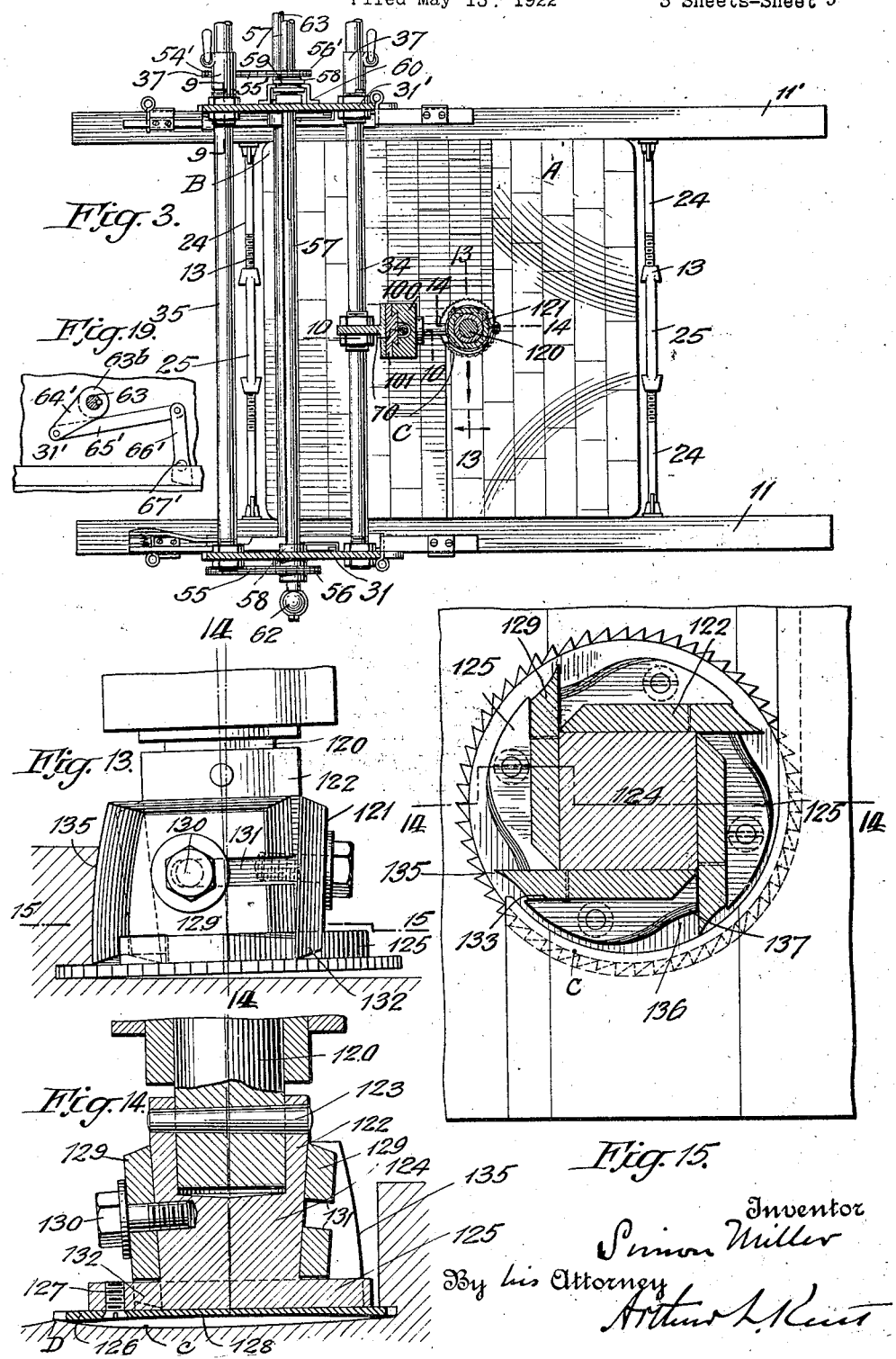

Patented Nov. 20, 1923.

1,474,487

UNITED STATES PATENT OFFICE.

SIMON MILLER, OF NEWARK, NEW JERSEY.

METHOD OF AND APPARATUS FOR TRUING SURFACES.

Application filed May 13, 1922. Serial No. 560,561.

*To all whom it may concern:*

Be it known that I, SIMON MILLER, a citizen of the United States, residing at Newark, in the county of Essex and State of New Jersey, have invented certain new and useful Improvements in Methods of and Apparatus for Truing Surfaces, fully described and represented in the following specification and the accompanying drawings, forming a part of the same.

This invention relates to method of and apparatus for truing surfaces and more particularly to a portable surfacing machine for truing wooden surfaces such as the surfaces of cutting blocks used by butchers and others. The invention aims to provide a machine of this kind which shall be of relatively light weight, readily taken apart for transportation and set up for use, easily operated, and accurate and efficient in operation.

Difficulty has been experienced in the attempts heretofore made to provide a surfacing apparatus having a circular saw cutter moved edgewise over the surface being trued, owing to the friction of the saw against the cut surface, causing great resistance to the rotation of the saw. A principal object of the present invention is to avoid this difficulty, and to this end the rotary cutter or saw, instead of being mounted with its axis perpendicular to the direction of cutting or traversing movement, has its axis tipped slightly forward so that the saw stands at a slight angle to the cutting plane with its under surface, or surface which is toward the work, tilted slightly away from the surface formed by the forward or cutting portion of the periphery of the saw. Friction between the surface of the saw and the newly formed surface on the work or block is thus entirely or substantially eliminated, and the load on the driving shaft is greatly reduced, permitting the cutter to be operated by a much smaller electric motor, for example, than could otherwise be used without overloading, and permitting the use of current from the ordinary lighting circuit. This avoidance of frictional contact between the saw and the cut surface has the further advantage of preventing burning of the surface by the heated saw.

Other objects and advantages of the invention are hereinafter pointed out, or will appear from the following description.

An organized portable block surfacing machine embodying the invention in the form which I now consider best comprises a supporting frame having legs of adjustable length and side members which may be clamped against opposite sides of the block to be surfaced; a carriage of adjustable width removably mounted on the side members of the frame and movable thereon to provide the feeding movement; a cross slide mounted on the carriage and movable thereon to give the cutter its traversing or cutting movement; and an electric motor and cutter driven thereby mounted on the cross slide. The cutter comprises a circular saw mounted to move edgewise in its feeding and traversing movements, and clearing blades above the saw to act when deep cuts are being made, the cutter being mounted with its axis tipped slightly forward in the direction of the traversing movement, in order to avoid friction between the surface of the saw and the block. The clearing blades are most desirably formed and mounted in a manner hereinafter described to improve the cutting action of the blades.

A full understanding of the invention can best be given by a detailed description of an organized machine embodying the various features of the invention, and such a description will now be given in connection with the accompanying drawings illustrating such a machine, and in which:—

Fig. 1 is a side elevation of the machine indicating in dot and dash lines a cutting block to which the machine is clamped;

Fig. 2 is an end elevation of the machine indicating the cutting block in dot and dash lines;

Fig. 3 is a plan view showing the machine sectioned on the line 3—3 of Fig. 1, and showing the block in full lines;

Fig. 4 is an enlarged fragmentary inside elevation of one of the side rails and one of the legs, showing the connection between the two;

Fig. 5 is a fragmentary vertical section on the line 5—5 of Fig. 4;

Fig. 6 is an enlarged fragmentary side view of one of the side members of the frame and a portion of the carriage, showing one of the brushes for keeping the ways of the side members clear of sawdust and shavings;

Fig. 7 is a vertical section on the line 7—7 of Fig. 6;

Fig. 8 is an enlarged fragmentary horizontal section on the line 8—8 of Fig. 1, showing the means for adjusting the length of one of the legs;

Fig. 9 is an enlarged fragmentary end elevation sectioned on the line 9—9 of Fig. 3, and showing the adjustable connection between one of the side plates and one of the cross-bars of the carriage;

Fig. 10 is an enlarged vertical section on the line 10—10 of Fig. 3, and Fig. 11 showing the cross slide and the vertical slide and the means for adjusting the tip of the axis of the cutter in the direction of the feeding movement;

Fig. 11 is a vertical section on the line 11—11 of Fig. 10, showing the means for adjusting the tip of the axis of the cutter in the direction of the traversing movement;

Fig. 12 is a fragmentary plan view of the parts shown in Figs. 10 and 11;

Fig. 13 is an enlarged elevation of the cutter showing the block sectioned on the line 13—13 of Fig. 3;

Fig. 14 is a vertical section of the cutter and a portion of the block taken on the line 14—14 of Figs. 3, 13 and 15;

Fig. 15 is a plan view of the cutter and a portion of the block, the cutter being sectioned on the line 15—15 of Fig. 13;

Fig. 16 is an enlarged fragmentary inside elevation of the fixed side plate of the carriage, and of one of the side rails, showing the parts of the locking mechanism mounted on that side plate;

Fig. 17 is an enlarged top view of the parts shown in Fig. 16, the side plate being sectioned on the line 17—17 of Fig. 16;

Fig. 18 is an enlarged fragmentary end elevation sectioned on the axis of the locking shaft and showing the mounting of this shaft in the adjustable side plate of the carriage; and Fig. 19 is an enlarged fragmentary inside elevation of the adjustable side plate of the carriage showing the parts of the locking mechanism mounted upon that plate.

The frame 10 of the machine shown in the drawings comprises two spaced side members 11 and 11', adjustable legs 12, 12' detachably secured to the side members, and adjustable tension members 13, for clamping the side members against the sides of a cutting block A.

Each of the legs 12, 12' comprises an upper member 14 which may have the form of a channel iron and a lower member 15 also having the form of a channel iron and fitting over and slidable on the upper member 14, the members 14 and 15 being secured together in adjusted position by means of a bolt 16 and nut 17. A plurality of bolt holes 18 are provided in the lower member 15 to permit adjustment of the length of the leg.

The side members 11 and 11' each consist of two channel irons welded or otherwise secured together so as to give each of the side members a cross-section of the form shown in Fig. 7. Each side member thus provides an open way 22 and a closed inside beam 23. The upper ends of the upper members 14 of the legs are inserted in slots in the beams 23 and retained therein by securing the upper members 14 to projections 20 extending from the bottoms of the beams 23 by means of pins 21.

Each of the tension members 13 comprises two rods 24 whose inner ends may be drawn toward each other by a turn buckle 25. At the outer end of each rod 24 is an enlarged head 26 which is placed inside the beam 23 of one of the side members 11, 11'. The rods extend through longitudinal slots 27 formed in the inner sides of the end portions of the beams 23. By sliding the rods along these slots they may be placed close to the ends of the block A regardless of the length of the block. Each rod 24 is clamped to one of the beams 23 by means of a wing nut 28 mounted on the rod.

Mounted on the side members 11, 11' is a carriage 30 comprising two side plates 31, 31' and four cross-bars 32, 33, 34, 35 extending between the side plates. The cross-bars are fixedly secured to the side plate 31 by means of nuts 36, and are adjustably secured to the side plate 31' so as to permit the variation of the width of the carriage. The cross-bars 32, 34, 35 extend through sleeves 37 secured in the side plate 31' by nuts 36'. The outer portion of each of the sleeves 37 is split, as best seen in Figs. 3 and 9, and provided with a bolt 38 by means of which it may be clamped on the cross-bar that extends through it. The cross-bar 33 need not be clamped to the plate 31', but may be left free to slide in a bushing 39 secured to this side plate.

The carriage 30 is slidably mounted on the side members 11, 11' by means of wheels 40 which are mounted on studs 41 extending inwardly from the side plates 31, 31' near their bottom edges. The wheels 40 fit closely in the ways 22 of the side members, but sufficient clearance is allowed to permit their rolling on the lower surfaces of the ways.

In order to prevent the collection of sawdust and shavings in the ways 22 of the side members 11, 11' in such manner as to obstruct or render inaccurate the movement of the wheels 40 in the ways, clearing brushes 43 are provided. The brushes 43 are secured to the side plates of the carriage by means of longitudinal bars 44 which extend under brackets 45 secured to the inside of the side plates and through brackets 46 secured to the brushes. Removable pins 47 prevent longitudinal movement of the bars 44 with respect to the side plates. The brushes are retained against outward movement on the bars 44 by pins 48, while the engagement of their inner ends with the side plates prevents inward movement of the brushes. The bristles of the brushes 43 are forced against the lower sides of the ways 22 by springs 49 secured to the back of the brushes and engaging the upper sides of the ways.

Means are provided for effecting even and easy movement of the carriage 30 along the ways 22 of the side members 11, 11'. This movement of the carriage causes the feeding movement of the cutter as hereinafter explained. The means for effecting this movement will next be described. Racks 50, 50' are secured along the bottoms of the side members 11, 11' near their outer edges. These racks are engaged respectively by pinions 51, 51' mounted on the short stub shafts 52, 52' which are journalled in downward extensions 53, 53' of the side plates 31, 31'. On the outer end of the stub shafts 52, 52' are mounted sprockets 54, 54' which are connected by sprocket chains 55, 55' to sprockets 56, 56' mounted on a shaft 57 extending between the side plates 31, 31' of the carriage 30. The sprocket 56 is keyed to the shaft 57 in the ordinary manner near one end of the shaft which is journalled in a bushing 58 secured to the side plate 30. In order to permit adjustment of the width of the carriage, the sprocket 56' is mounted on a hub 58 which is slidably mounted on the shaft 57 and secured against rotation with respect to the shaft by a key extending into a long keyway 59 in the shaft. In order to retain the sprocket 56' in alignment with the sprocket 54' regardless of the width of the carriage, the hub 58 is provided with a circumferential groove 59 and is retained in fixed relation to the side plate 31' by brackets 60 secured to this plate and engaging the groove 59. The shaft 57 may be turned by means of a handle 62 mounted upon the end of it which is journalled in the side plate 31. It will be noted that when the handle 62 is turned, opposite sides of the carriage are positively moved along the side members 11, 11' at the same rate, so that the carriage is not twisted or jammed in the ways 22.

Locking mechanism is provided for locking the carriage 30 to the side members 11, 11' after it has been properly positioned on the side rails by means of the moving mechanism just described. The shaft 63 of the locking mechanism extends between the side plates 31, 31' of the carriage. The shaft is journalled in the side plate 31, and is retained against longitudinal movement with respect to the side plate 31 by means of a collar 63ª fixed to the shaft outside this side plate and an arm 64 keyed to the shaft inside the side plate. In order to permit adjustment of the width of the carriage the shaft 63 is slidably mounted in a hub 63ᵇ which is journaled in a hole in the side plate 31'. The hub 63ᵇ is retained against axial movement in this side plate by a collar 63ª' which is secured to the hub 63ᵇ and engages the outer surface of the side plate, and an arm 64' extending from the hub 63ᵇ and lying inside the side plate. The shaft is secured against rotation with respect to this hub 63ᵇ by the engagement of a key fixed in the hub with a long keyway in the shaft. The arm 64 is provided with a projection 64ª which is connected by a link 65 to the outer end of a locking lever 66 which is mounted on a pivot 67 extending inwardly from the side plate 31. The arm 64' is connected by a link 65' to a locking lever 66' mounted on a pivot 67' projecting inwardly from the side plate 31'. The lower ends of the locking levers 66, 66' lie close to the top surfaces of the side members 11, 11'. The outer end of the arm 64 is provided with a handle 68 by means of which the shaft 63 may be turned. A spring actuated pin 69 cooperating with holes 69ª in the side plate 30 serves to retain the handle in any position to which it may be turned. From the arrangement described and illustrated, it is apparent that if the handle 68 be moved upwardly the links 65, 65' will draw the locking levers 66, 66' out of the vertical so that their lower ends are clear of the upper surfaces of the side rails 11, 11', permitting free movement of the carriage on the side members. When, however, the handle 68 is pushed down, the locking levers 66, 66' are moved toward a vertical position so that their lower ends are forced against the top surfaces of the side members 11, 11'. Owing to the leverage provided, the lower ends of the locking levers may be pressed down with sufficient force to raise the entire carriage slightly so as to bring the wheels 40 of the carriage against the upper surface of the ways 22 of the side members. This serves not only to lock the carriage against longitudinal movement on the side members, but to prevent any up and down vibration of the wheels 40 in the ways 22 when the carriage is locked.

A cross slide 70 is mounted on the carriage 30. The cross slide 70 is T-shaped in horizontal section as best seen in Figs. 3 and 12, and consists of a front plate 72 and a rear flange 71. Two sleeves 73, 74, slidably mounted on the cross bars 33, 34 of the carriage respectively, and each externally threaded, extend through holes in the back flange 71 of the slide 70 and are secured thereto by means of nuts 76.

The cross bars 33, 34 are vertically aligned; but the hole 77 in the flange 71 through which the sleeve 73 extends is elongated so as to permit the cross slide 70 to be tipped away from the vertical. A set screw 79 in a tapped hole in the back flange 71 having its inner end engaging the sleeve 73 may be used to regulate the degree to which the slide is tipped from the vertical. It will be understood that in order to adjust the angle of tip of the slide the nuts 76 are loosened. The object of the adjustment just described is to provide means for tipping the tool axis in the direction of the feeding movement, as hereinafter explained.

Means are provided for moving the cross slide 70 along the cross bars 33, 34 of the carriage. This movement of the slide effects the traversing movement of the cutter in a manner hereinafter described. The movement is effected by turning a worm shaft 85 which extends through an internally threaded sleeve 86 secured to the back flange 71 of the cross slide by nuts 76'. The hole 78 in the back flange 71, through which the sleeve 86 extends, is slightly elongated to permit the tipping of the slide before mentioned. The worm shaft 85 is journalled in the side plates 31, 31' and provided with a handle 87. Collars 88 secured to the worm shaft prevent it from sliding in the side plate 31. The worm is, however, free to slide in its bearing in the side plate 31' in order to permit of the width of the carriage.

A vertical slide 100 is mounted on the cross slide 70. A vertical guide-way 101 for the slide 100 is secured to the front plate 72 of the cross slide 70 by means of bolts 102. The holes 103 in the flange 72 through which the bolts 102 pass are elongated so as to permit tipping the guide-way with respect to the cross slide. In order to facilitate the adjustment of the angle between the guide-way 101 and the cross slide 70, the guide-way 101 is provided with set screws 104 engaging pins 105 projecting from the guide-way 101 into slots 106 in the flange 72. It will be understood that in order to adjust this angle the bolts 102 must be loosened. The object of the adjustment just described is to provide means for tipping the tool axis in the direction of the traversing movement, as hereinafter explained.

Means are provided for effecting a substantially vertical movement of the slide 100 in the guide-way 101. These means include a vertical worm shaft 110 journalled in the slide 100 and passing through a nut 111 formed integral with the guide-way 101. The worm shaft 110 is provided with collars 112 to restrain it against vertical movement with respect to the slide 100 and with a handle 113.

Detachably secured to the front of the vertical slide 100 is a motor casing 115. The casing 115 is seated against flanges 116 projecting from the front side of the slide 100. Studs 117 projecting from the casing 115 pass through holes in the slide. Pins 119 passed through holes in these studs and engaging the rear surface of the slide hold the casing 115 firmly against the flanges 116.

The motor casing 115 contains an electric motor of ordinary construction connected to a cutter shaft 120 which is journalled in the casing and projects downwardly from the bottom thereof. The bearings of this shaft are so arranged that the shaft is parallel to the direction of movement of the vertical slide 100 in the guide-way 101. At its lower end the cutter shaft carries a cutter 121 comprising a cutter head 122 fitted on the end of the shaft and secured by a pin 123, a circular saw and four clearing blades. The cutting head has a downwardly and inwardly tapering portion 124 which is square in cross-section, and a disc-shaped bottom portion 125. A circular saw 126 is secured to the bottom of the disc-shaped portion 125 by means of screws 127. The saw 126 most desirably has its bottom surface 128 made slightly concave for a purpose hereinafter explained, and its teeth are most desirably slightly staggered as is usual in circular saws. As the form of saw teeth is well known, this staggering of the teeth is not shown in the drawings.

The clearing blades 129 are secured to the sides of the square portion 124 of the cutter head by means of bolts 130 which pass through slots 131 in the blades. Each blade is provided near its front end with a downward projection 132 which fits in a slot 133 in the disc-shaped portion 126 of the cutter head. Owing to the taper of the square portion 124 of the cutter head, each clearing blade 129 lies in a plane which is inclined to the axis of the cutter and intersects this axis at a point below the saw. This inclination of the blades possesses important advantages which are hereinafter explained, and there is cooperation between the inclination of the blades and the fitting of the downward projections of the blades in the slots 133 of the disc-shaped portion 126, in that the inclination of the blades causes the lower ends of the blades to enter the wood in advance of the rest of the blades while the thrust thus brought against the lower ends of the cutting edges of the blades is effectively resisted by the fitting of the downward projections of the blades in the slots of the disc-shaped portion. The cutting edge 135 of each blade is inclined outwardly toward its lower end and convexly curved as best seen in Fig. 13. The position and curvature of the cutting edges is such that they lie in a cylindrical surface coaxial with the cutter. A curved recess 136 is formed in the periphery of the disc-shaped portion 125 of the cutter head just in front of the cutting edge of each blade, and the edge 137 of each recess is inclined upwardly so as to direct the shavings removed by the blade upwardly.

The use and operation of the machine described is as follows:—The machine may be taken apart for transportation. When brought to the place in which it is used it is assembled about the cutting block A in the following manner:—The legs 12, 12' are secured to the projections 20 of the side members 11, 11' respectively by means of the pins 21. The length of the legs is adjusted so as to bring the side members a little below the upper surface of the block A. The side members are then clamped against opposite sides of the block by means of tension members 13. The carriage 30 is then placed in position upon the side members. The wheels 40 secured to the side plate 31 are first inserted in the way 22 of the side member 11 and the side plate 31' is then slid along the cross-bars 32, 33, 34, 35 as well as the shafts 57, 63, 85 toward the side plate 31 until its wheels 40 are brought into the way 22 of the side member 11'. The side plate 31' is then secured to the cross bars 32, 34, 35 by means of the clamping bolts 38. The bars 44 and the brushes 43 are then placed in the position illustrated in the drawing and secured in this position by inserting the pins 47, 48. The motor casing carrying the cutter 121 is then secured to the vertical slide 100 by means of the pins 119.

After the machine has thus been assembled about the block A, the carriage is moved to a position near the left-hand end of the side members by turning the handle 62, and the cross slide 70 is moved close to the side plate 31' of the carriage by turning the handle 87. The cutter is thus just behind the corner B of the block A (Fig. 3). The handle 113 is then turned until the saw 127 is at a level slightly below the deepest trough or indentation in the cutting surface of the block A.

The motor driving the cutter shaft 120 is then placed in operation and the cutter 121 is fed forward by turning the handle 62 in an anti-clockwise direction until most desirably about three-quarters of the saw 126 has entered the block. The handle 68 of the locking mechanism is then pushed down so that the lower ends of the blocking levers 66, 66' are forced against the tops of the side members 11, 11' locking the carriage against longitudinal movement on the side members and drawing the wheels 40 of the carriage against the upper surfaces of the ways 22 so that no vibration of the carriage on the rails can occur during the cutting. A traversing movement of the cutter across the block is caused by turning the handle 87. This handle is turned until the cutter has been traversed clear across the block. The carriage locking mechanism is then released by raising the handle 68, and the carriage 30 is moved backward a distance equal to about one-quarter the diameter of the saw 126 by turning the handle 62 in a clockwise direction, thus moving the cutter outwardly, that is to say, in the direction opposite to its feeding movement. The carriage is again locked to the side rails by pushing down the handle 68, and the cutter is traversed backward across the block by turning the handle 87, until it reaches the side of the block against which the rail 11' is secured. The carriage is again unlocked by raising the handle 68, and the cutter is then fed forward again by turning the handle 62 until about three-quarters of the saw 126 enters the uncut portion of the block. After the carriage is again locked to the side members, the cutter is again traversed across as before by turning the handle 62; and the series of operations is repeated until the entire cutting surface of the block has been trued.

As each of the cross-bars 33, 34 upon which the cross-slide 70 moves lies in a plane parallel to the plane of the surfaces of the ways 22 on which the wheels 40 of the carriage 30 travel, the traversing movement and the feeding movement of the cutter are in a common plane which, in the machine illustrated, is a horizontal plane. The saw 126 lies approximately in this common plane, that is to say, the saw is approximately horizontal, but owing to the angle between the guideway 101 and the cross slide 70, best seen in Fig. 11, the axis of the cutter is tipped slightly forward from the vertical in the direction of the traversing movement of the cutter. This inclination of the cutter axis is shown best in Fig. 13. This inclination of the cutter axis makes the front edge of the cutter slightly lower than the rear edge so that a clearance is allowed between the saw and the surface formed on the block, except at the front half of the edge of the saw, all or part of which is doing the cutting. This clearance is increased by the concavity of the bottom of the saw. The result of this clearance is to eliminate friction between the lower surface of the saw and the block, thus making the load upon the motor much less than if these surfaces were in contact, and making it possible to cut rapidly without danger of burning the surface of the block.

Although the forward inclination of the cutter axis in the direction of the traversing movement is very slight, it necessarily results in causing the saw to cut a slight elliptical groove in the block, at each traverse. I have found, however, that grooves and ridges may be avoided and a substantially true surface obtained by inclining the cutter axis sideways, to a less extent than this axis is inclined forwardly, in the direction of the traversing movement. The sideways inclination of the cutter axis results from the inclination of the slide 70 with respect to a vertical plane passing through the axes of the cross-bars 33, 34, which is best seen in Fig. 10. The sideways inclination of the cutter axis is shown in Fig. 14. While the sideways inclination of the cutter axis may be in either direction, I find it most desirable to make the sideways inclination outward, that is to say, in the direction opposite to that of the feeding movement, as illustrated in Fig. 14. The result of the two inclinations of the cutter axis is to make the lowest point of the periphery of the saw at about the point C (Figs. 3, 14, 15) so that the lowest point of the elliptical groove formed by the saw is about at the point C, as seen in Fig. 14. This results in leaving a very slight ridge D under the outer part of the saw after each forward traverse of the cutter. The ridge D is shown in Fig. 14, where its height is considerably exaggerated for the sake of clearness. If, however, the saw is moved outwardly to a distance equal to about one-fourth of its diameter after each forward traverse and before each backward traverse, in the manner hereinbefore described, the saw will remove this ridge during the backward traverse, so that a smooth surface is formed on the block. The sideways inclination of the cutter axis is essential to a satisfactory removal of the ridge on a backward traverse, for if the axis were inclined only forwardly in the direction of the traversing movement, the lower surface of the saw would be wedged against the ridge during the backward traverse.

When a deep cut is taken, the material left above the saw is removed by the clearing blades 125. Owing to the taper of the square portion 124 of the cutting head and the consequent inclination of the cutting blades with respect to the axis of the cutter, the cutting edge 135 of each blade has a shearing action on the material to be removed, the lower end of the cutting edge of the blade being in advance of its upper end. As a result, the material is sliced off easily in the form of clean shavings which are directed upwardly by the blades and by the inclined surfaces 137 and thrown out by the rotation of the cutter. The outward curve and the inclination of the cutting edges 135, which results in forming a vertical surface at the edge of the cut, also contributes to this result. Owing to the clean cutting or shaving action of the clearing blades, these blades remove the material left by the saw with very little addition to the load on the motor.

It should be clearly understood that my invention is by no means limited to the specific embodiment of it which has been described. Furthermore, various features of the invention while most advantageously combined as in the embodiment shown may nevertheless under certain circumstances be used separately.

What is claimed is:

1. A method of forming a substantially flat surface on a block, comprising traversing a circular saw forward and backward across the block in parallel lines with the axis of the saw tipped slightly forward with respect to the forward traverses, and feeding the saw outward after each forward traverse and before the next backward traverse to such an extent that the lowest part of the periphery of the saw is brought over the ridge left under the outer edge of the saw during the forward traverse so that substantially all of said ridge is removed on the next backward traverse.

2. A surfacing machine, comprising a circular saw, and means for causing feeding and traversing movements of the saw in a common plane approximately perpendicular to the axis of the saw, the axis of the saw being tipped from perpendicular to said plane forwardly, and to a less extent sideways, with respect to the direction of the traversing movement.

3. A surfacing machine, comprising a circular saw, means for causing a feeding movement of said saw, means for causing a traversing movement of said saw in the same plane as said feeding movement and in a direction transverse to said feeding movement, adjustable means for varying the angle between the axis of said saw and a perpendicular to said plane in the direction of said traversing movement, and adjustable means for varying the angle between the axis of said saw and a perpendicular to said plane in the direction of said feeding movement.

4. A surfacing machine, comprising an approximately horizontal circular saw, means for causing feeding and traversing movements of said saw in a common horizontal plane, said saw being so inclined to said plane that the lowest point of the periphery of said saw is in advance of, and at one side of, the axis of the saw during the traversing movement.

5. A surfacing machine, comprising an approximately horizontal circular saw, means for causing feeding and traversing movements of said saw in a common horizontal plane, said saw being so inclined to said plane that a radius thereof passing through the lowest point of the periphery thereof lies at an angle approximately 22½° to the direction of said traversing movement.

6. A surfacing machine, comprising an approximately horizontal circular saw consisting of a thin metal disc having peripheral saw teeth, means for causing a horizontal feeding movement of said saw, means for causing a horizontal traversing movement of said saw in a direction transverse to said feeding movement, the lower surface of said saw being concave and the axis of said saw being inclined forwardly from the vertical in the direction of the traversing movement to allow a clearance between the lower surface of the saw and the surface formed on the work by the saw.

7. A surfacing machine, comprising an approximately horizontal circular saw, means for causing a horizontal feeding movement of said saw, means for causing a horizontal traversing movement of said saw in a direction perpendicular to said feeding movement, the lower surface of said saw being concave and the axis of said saw being inclined from the vertical forwardly, and to a less extent sideways, with respect to the direction of said traversing movement.

8. In a surfacing machine, a cutter comprising a cutting head having a portion polygonal in cross-section, and a disc portion at one end of said polygonal portion containing slots parallel to the sides of said polygonal portion, a circular saw secured to the outer surface of said disc portion and clearing blades secured to the sides of the polygonal portion and having at their forward ends downward projections fitting closely in the slots of the disc portion, and abutting against the saw, said blades having cutting edges extending along the front ends of said projections.

9. In a surfacing machine, a cutter comprising a cutting head having an inwardly tapering portion polygonal in cross-section and a disc portion at the smaller end of said polygonal portion containing slots parallel to the sides of said polygonal portion, a circular saw secured against the outer surface of said disc portion, and clearing blades secured to the sides of the polygonal portion and having near their front ends downward projections fitting closely in the slots of the disc portion and abutting against the saw, said blades having cutting edges extending along the front ends of said projections.

10. In a block surfacing machine, the combination with a frame including two side members and adjustable means for clamping them against the sides of a block, of a carrier comprising two vertical side plates slidably mounted on said side members respectively and two cross-bars located one above the other extending between said side plates and secured to the side plates so as to retain the side plates parallel to each other while permitting an adjustment of the distance between them, a cross-slide slidably mounted on said cross-bars, a motor having a vertical shaft and mounted on said cross-slide, and a cutter mounted at the lower end of the motor shaft.

11. In a block surfacing machine, a frame having two parallel side members, means for adjusting the distance between said side members, a carriage having two side plates slidably mounted on said side members respectively, means for adjusting the distance between said side plates, a rotatable shaft extending between said side plates and journalled therein, means for restraining said shaft against longitudinal movement with respect to one of said side plates, a sprocket fixed on said shaft near one of said side plates, a sprocket slidably mounted on said shaft near the other of said side plates, means for restraining said sprocket against rotation relative to said shaft, means for restraining said sprocket against axial movement relative to said side plate, two stub shafts pivotally mounted, one on each of said side plates, two sprockets mounted, one on each of said stub shafts and one aligned with each of said first-mentioned sprockets, two pinions, one fixed on each of said stub shafts, and two racks, one extending along each of said side members and one engaged by each of said pinions.

12. In a block surfacing machine, a frame having two parallel side members, a carriage having two side pieces slidably mounted on said side members respectively, means for moving said carriage along said side members, means for locking one of said side pieces to the side member on which it is mounted, separate means for locking the other of said side pieces to the side member on which it is mounted, and means for actuating said two locking means simultaneously.

13. In a block surfacing machine, a frame having two parallel side members, a carriage having two side plates slidably mounted on said side members respectively, a rotatable shaft extending between said side plates and journalled therein, two pinions pivotally mounted, one on each of said side plates, two racks, one extending along each of said side members and engaged by said pinions respectively, a driving connection between said shaft and each of said pinions, a turnable shaft extending between said side plates and journalled therein, two locking means mounted, one on each of said side plates and adapted to lock said side plate to the side member on which it is mounted, and a connection between said turnable shaft and each of said locking means.

14. In a block surfacing machine, the combination of a frame having side members providing parallel ways, a carriage slidably mounted on said ways and having two cross-bars, a cross-slide slidably mounted on said cross-bars, a member providing substantially vertical ways mounted on said cross-slide, adjustable means for tipping said member with respect to said cross-slide so as to turn said ways laterally from the vertical, a slide mounted on said ways, a motor casing secured to said slide, and a cutter mounted in said casing with its axis parallel to said substantially vertical ways.

15. In a block surfacing machine, the combination of a frame having side members providing parallel ways, a carriage slidably mounted on said ways and having two cross-bars lying in a plane perpendicular to the plane of said ways, a cross-slide slidably mounted on said cross-bars, adjustable means for tipping said slide with respect to the plane of said cross-bars, a member providing substantially vertical ways mounted on said cross-slide, adjustable means for tipping said member with respect to said cross-slide so as to turn said ways laterally from the vertical, a slide mounted on said ways, a motor casing secured to said slide, and a cutter mounted in said casing with its axis parallel to said substantially vertical ways.

16. In a surfacing machine a frame having a side member providing a way having parallel upper and lower surfaces, a carriage mounted on said side member and having a supporting wheel in said way and less in diameter than the distance between the upper and lower surfaces of the way so that it is free to roll on the lower surface, and means on said carriage adapted to engage said side member, lock the carriage, and move it upwardly so as to press said wheel against the upper surface of said way to accurately locate the plane of the carriage by the upper side of the way.

In testimony whereof I have hereunto set my hand in the presence of two subscribing witnesses.

SIMON MILLER.

Witnesses:
A. L. KENT,
AGNES E. CUNNEEN.